F. C. SCHULTE.
ROTARY SETTING-UP KEG FORM AND TABLE.
APPLICATION FILED MAR. 24, 1908.

899,191. Patented Sept. 22, 1908.

Witnesses

Inventor:
Frank C. Schulte
by Hopkins & Hicks Attys.

UNITED STATES PATENT OFFICE.

FRANK C. SCHULTE, OF ST. LOUIS, MISSOURI.

ROTARY SETTING-UP KEG FORM AND TABLE.

No. 899,191.  Specification of Letters Patent.  Patented Sept. 22, 1908.

Application filed March 24, 1908. Serial No. 423,070.

*To all whom it may concern:*

Be it known that I, FRANK C. SCHULTE, a citizen of the United States, and resident of St. Louis, Missouri, have invented certain new and useful Improvements in Rotary Setting-Up Keg Forms and Tables, of which the following is a specification.

This invention relates to improvements in a rotary setting-up keg form and table, and consists in the novel arrangement, construction and combination of the parts as will be fully hereinafter described and claimed.

The object of my invention is to construct a table rotatably arranged as well as adjustable, so as to be convenient for the operator in constructing kegs or the like.

A further object of my invention is to provide a form whereby kegs or such articles of cooperage may be constructed at a convenient position to the operator.

Figure 1:
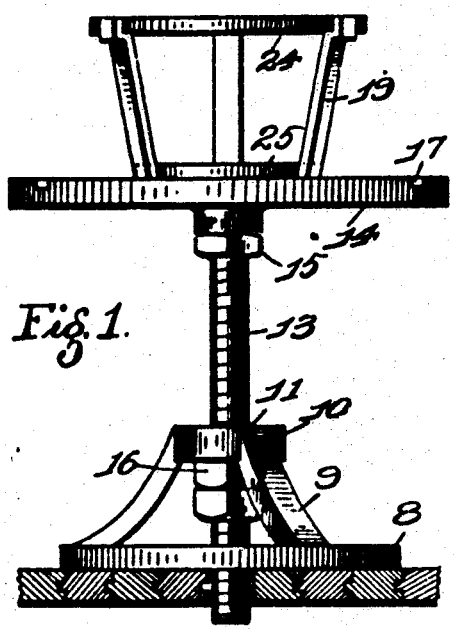
Figure 2:
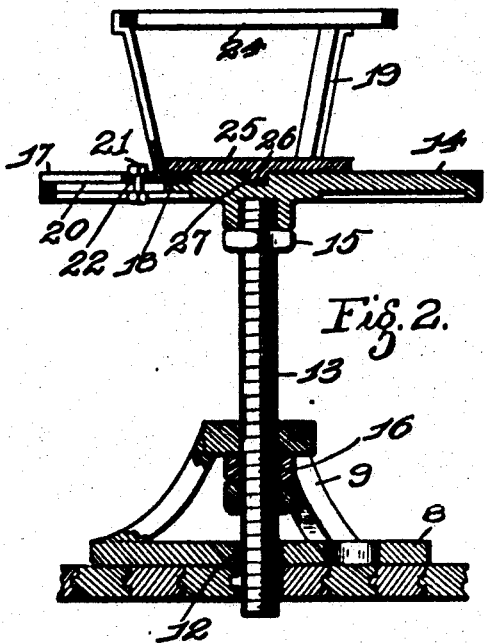
Figure 3:
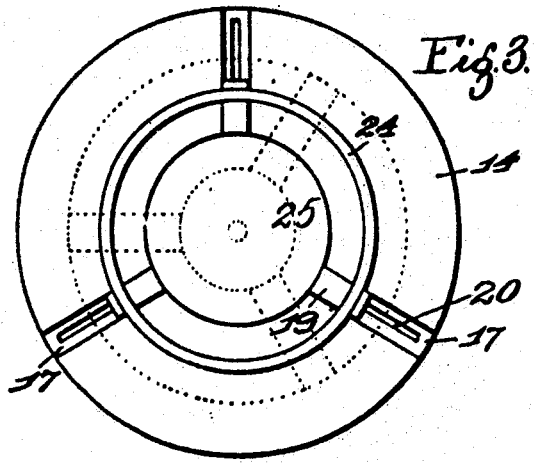
Figure 4:
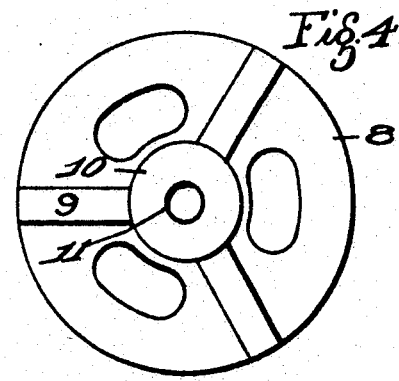
Figures 5, 6:
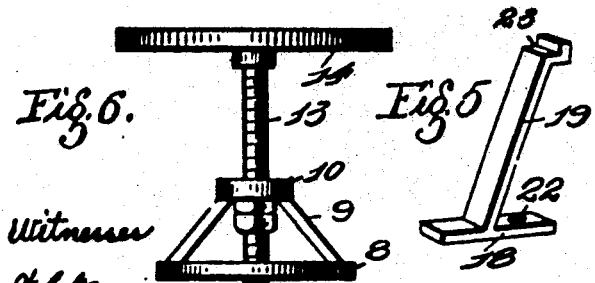
Figure 7:
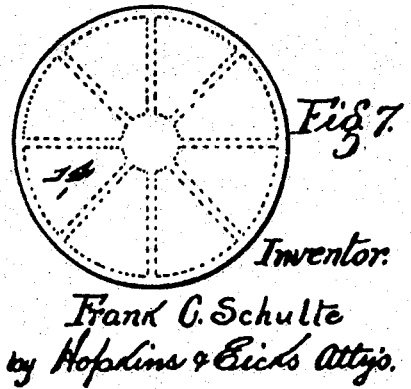

Figure 1 is a side view of my complete invention. Fig. 2 is a central sectional view of the same. Fig. 3 is a top plan view. Fig. 4 is a top plan view of the base. Fig. 5 is a detail perspective view of one of the sliding supports of the keg frame. Fig. 6 is a side view of a modified form of my invention. Fig. 7 is a top plan view of the same.

In the construction of my invention, I provide a suitable base plate 8, which is provided with a plurality of arms 9, the upper ends connected to or formed integral with a disk 10. The disk 10 is provided with an internally screw threaded bore 11, and the base 8 is provided with a central opening 12.

In the screw threaded bore 11, is inserted a screw threaded stem 13, its upper end removably connected to a table 14, and on said stem is formed an enlargement 15, having flattened faces for the accommodation of a wrench, whereby the stem may be operated so as to be adjusted to accommodate the required height desired by the operator. Upon the stem 13 and beneath the disk 11 are placed nuts 16, which are designed to assist in retaining the table in a rigid position when properly adjusted.

The table 14 is provided with grooves 17, in which are placed the base 18 of the sliding supports 19, and each of said grooves 17 are provided with elongated slots 20, through which are passed bolts 21 and also through the opening 22 formed in the base 18, whereby the supports are retained in rigid position when properly adjusted within the grooves 17.

The upper ends of the supports 19 are properly shaped forming recesses 23 in which rests the ring 24.

On the table 14 is located a plate 25, provided on its underside with a centrally located trunnion 26, which fits into an opening 27 formed in the table 14. This plate is removably located on the table and may be replaced by a plate of larger or smaller diameter, to accommodate the various sizes of kegs to be formed, and when such plate is placed upon the table, the supports 19 are adjusted accordingly and the ring 24 replaced by a ring of sufficient size to correspond with the size of the keg to be formed, and to snugly rest within the recesses 23 formed in the upper ends of the supports.

The essential feature of my invention is the adjustment and rotation of the table on which the article to be formed is placed.

By referring to Figs. 6 and 7, I show a modified form of the table without the use of grooves, the upper surface being absolutely smooth on which the articles are to be set.

Having fully described my invention, what I claim is:

A device of the class described, comprising a base; a screw threaded stem adjustably mounted in said base; a table supported on said stem, said table provided with grooves and elongated slots; sliding supports mounted in said grooves and arranged to be supported in an adjusted position; a ring supported by said supports and a disk located on the table between the supports, substantially as specified.

In testimony whereof, I have signed my name to this specification, in presence of two subscribing witnesses.

FRANK C. SCHULTE.

Witnesses:
ALFRED A. EICKS,
WALTER C. STEIN.